J. J. FAHRNEY.
TIRE HEATER.
APPLICATION FILED JAN. 14, 1919.
1,343,045.
Patented June 8, 1920.
2 SHEETS—SHEET 1.
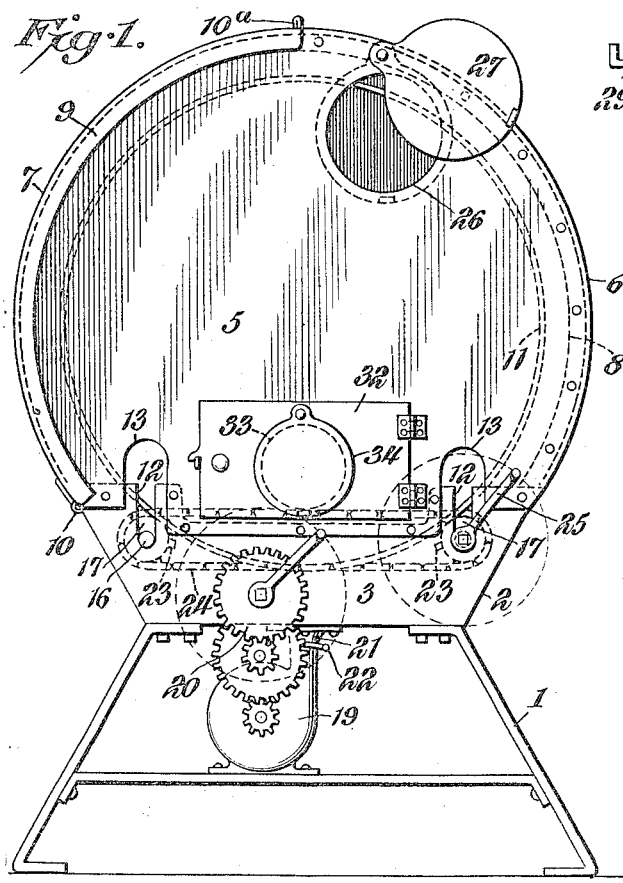
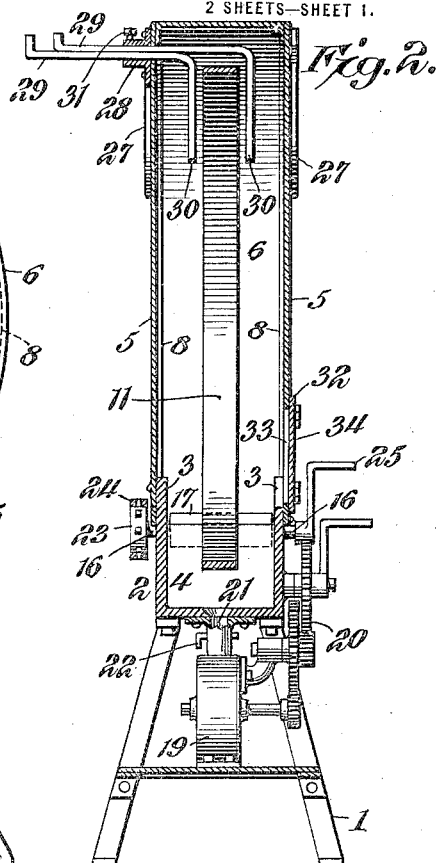
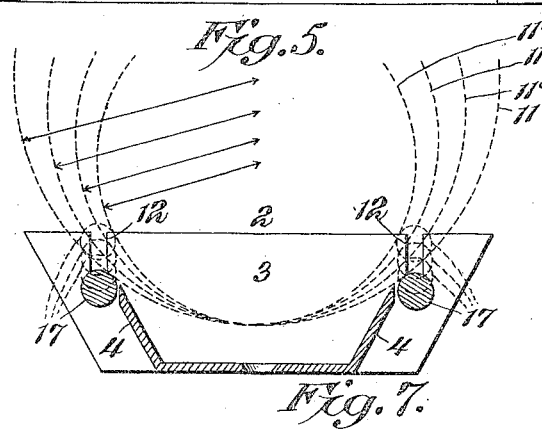
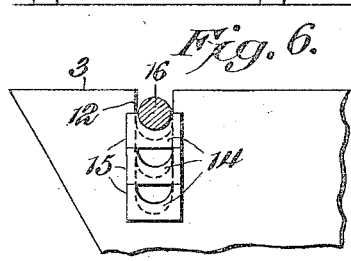
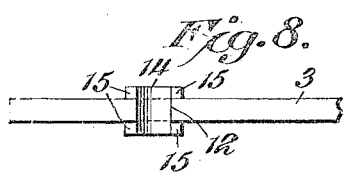
WITNESSES
Howard D. Orr.
H. T. Chapman
John J. Fahrney, INVENTOR,
BY E. G. Siggers
ATTORNEY J. J. FAHRNEY.
TIRE HEATER.
APPLICATION FILED JAN. 14, 1919.
1,343,045.
Patented June 8, 1920.
2 SHEETS—SHEET 2.
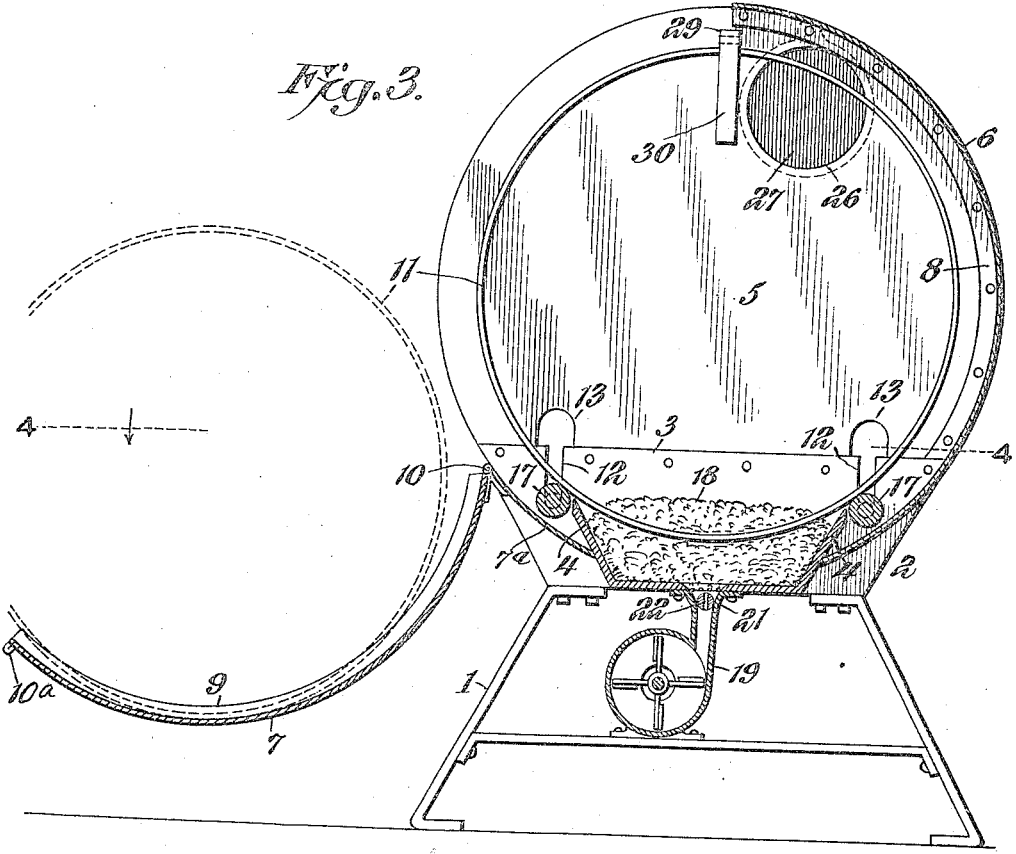
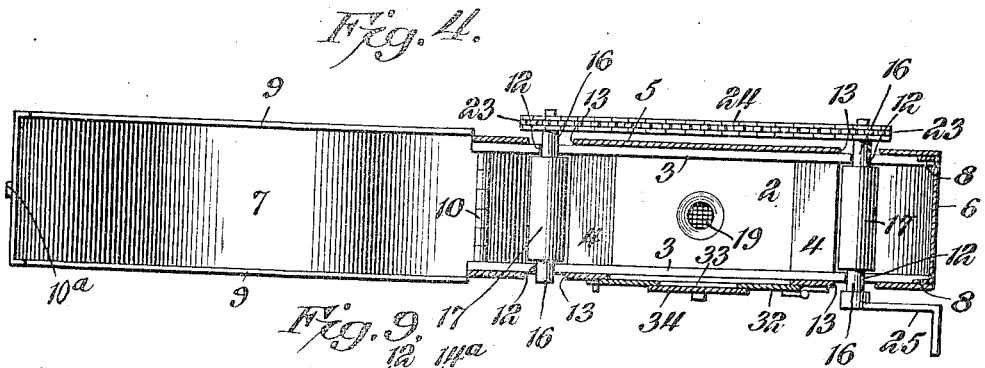
WITNESSES
Howard D. Orr
G. T. Chapman
John J. Fahrney, INVENTOR,
BY C. G. Siggers
ATTORNEY

UNITED STATES PATENT OFFICE.

JOHN J. FAHRNEY, OF TIMBERVILLE, VIRGINIA, ASSIGNOR OF ONE-HALF TO ERNEST M. HOOVER, OF TIMBERVILLE, VIRGINIA.

TIRE-HEATER.

1,343,045.  Specification of Letters Patent.  Patented June 8, 1920.

Application filed January 14, 1919. Serial No. 271,173.

*To all whom it may concern:*

Be it known that I, JOHN J. FAHRNEY, a citizen of the United States, residing at Timberville, in the county of Rockingham and State of Virginia, have invented a new and useful Tire-Heater, of which the following is a specification.

This invention has reference to tire heaters and is designed more particularly for use in small shops where tires are only occasionally heated, although the tire heater may be used continuously with good effect.

The object of the invention is to provide a tire heater of simple and efficient construction by means of which tires of different diameters may be handled with a minimum of change in the heater and with equally good results irrespective of the size of the tire.

In accordance with the invention there is provided a casing having a fire chamber or furnace at the lower end to supply the heat and means whereby the tire, irrespective of its diameter or width, may always be maintained in the most efficient portion of the fire chamber while being subjected to the heat, while the supporting means for the tire are protected in a large measure from the effects of the heat.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is an elevation of one face of the heater.

Fig. 2 is a vertical section from front to rear.

Fig. 3 is a section at right angles to Fig. 2 and showing a movable part of the casing in open position.

Fig. 4 is a horizontal section on the line 4—4 of Fig. 3.

Fig. 5 is a section of the fire-pot showing the different positions of tires of different diameters when applied thereto.

Fig. 6 is a fragmentary view with parts in section showing the arrangement for a tire of small diameter.

Fig. 7 is a view similar to Fig. 6 but showing the arrangement for supporting a tire of large diameter.

Fig. 8 is a plan view of the structure shown in Fig. 6 with the tire-supporting roller omitted.

Fig. 9 is a detail view of a modification of the adjustable bearings for the tire supporting rollers.

Referring to the drawings, there is shown a stand 1 of any suitable form and illustrated in the drawings as of bar metal suitably connected and braced, but is not necessarily confined to such structure. On the stand there is mounted a fire-pot 2 having laterally elongated side walls 3 and flaring end walls 4 spaced apart laterally of the structure to a less extent than the length of the side walls 3.

Fast to and rising from the side walls 3 are other walls 5 which may be though are not necessarily of approximately circular shape extending from the flaring end walls 4 to the top of the structure. The side walls 3 and 5 are joined by curved end walls 6, 7 respectively, of channel shape, the channel of the wall 6 being formed by flanges 8, and the channel of the wall 7 being formed by flanges 9. The wall 6 is riveted or otherwise secured to the walls 5 and continued to the walls 4. The wall 7 is hinged to a short section 7ª which is made fast to the walls 3 while the wall 7 is capable of moving around its hinge connection into or out of closed relation to the interior of the casing, that end of the wall 7 remote from the hinge connection indicated at 10, being provided with holding means 10ª of any suitable form by means of which the wall 7, constituting a door, may be secured in the closed position. The hinge 10 is located at or a little above the level of the top of the end walls 4, which latter form the ends of a fire chamber, and when the wall 7 is in the open position it serves as a receptacle, as will hereinafter appear. The cover member or door is of sufficient size so that when open it will permit the placing into the structure of the largest size tire for which the structure is intended. Such a tire is shown at 11 in Figs. 1, 2, 3 and 5.

Beyond the end walls 4 the side walls 3 are formed with matching upright slots 12 and above the upper open ends of these slots the walls 5 have continuations 13 of the slots 12 with the continuations of larger size than the slots.

Adapted to each slot 12 is a block 14 constituting a bearing block and provided with side wings 15 to embrace the corresponding wall 3. The blocks 14 may be arranged in piles in the slots 12 and each pair of matching blocks 14 in the side walls 3 constitutes bearings for spindles or trunnions 16 at opposite ends of a roller 17. There are two such rollers 17 constituting rotatable supports or journals for the tire 11. When a single pair of bearing blocks 14 is lodged in the slots 12 the support for the tire is low and is intended to carry next to the largest tire 11 for which the apparatus is designed. By adding blocks 14 the journal supports for the rollers 17 are raised and by properly proportioning the parts the lowermost points of the tires are brought into approximately one level, as indicated in Fig. 5, so that the low point of a tire irrespective of its diameter is always at about the same point in the fire chamber of the structure, whereby the tire, whether large or small, is always subjected to approximately the same heat. In Fig. 3 the tire 11, which is assumed to be next to the largest tire for which the structure is intended, has its lowermost point at an intermediate part of a body 18 of fuel lodged in the fire chamber between the side walls 3 and end walls 4. If a smaller tire is to be treated, say a tire 11$^a$, additional pairs of blocks 14 are lodged in the grooves 12, thus raising the journal supports of the rollers 17, wherefore, although the tire 11$^a$ is of smaller diameter than the tire 11, its lowermost point will approximately coincide with that of the tire 11. In like manner additional pairs of bearing blocks 14 will bring other tires 11$^b$ and 11$^c$, indicated in Fig. 5, to such position that their lowermost points will be at the same level as that of either the tire 11 or 11$^a$. In this manner tires of various diameters all have their lowermost points at about the same level while the supports for the tires are out of the direct influence of the hot flames or gases of combustion rising from the bed 18 of burning fuel.

A blower 19 with a train 20 of gearing for driving it is provided, the blower having an outlet or twyer 21 discharging into the bottom of the bed 18 of fuel. The outlet of the blower may be furnished with a blast control 22 of known construction, whereby the blast may be localized or spread as desired. Each tire supporting roller 17 has its journal extension 16 at one end suitably extended and provided with a sprocket wheel 23, the two sprocket wheels being joined by a chain 24 whereby the two rollers 17 may be rotated in the same direction by means of a crank 25 applied to the appropriate journal of one of the rollers 17.

One side wall 5 is provided near the upper end with an opening 26 controlled by a draft door or cover 27. One of the side walls 5 carries a bearing block 28 near its upper end and this block in turn carries two slidable members 29 terminating within the casing in downwardly extending fingers 30 serving as guides for opposite sides of the upper portion of a tire when within the casing and resting on the supporting rollers 17. The guides 29 are capable of movement independently of each other with the fingers 30 in associated relation and the guides are held in adjusted positions by a set screw 31 carried by the block 28.

In the operation of the structure, the heat is supplied either by the bed of fuel indicated at 18 or by any other suitable means commonly used for heating purposes. Ordinarily a bed 18 of coals will be employed since it is the customary practice to utilize such fuel in a blacksmith shop for which the invention is especially adapted.

A tire, say a tire 11, is placed in the casing and the door 7 is closed. Another door 32 is provided in one of the sides 5, say the same side as the opening 26. The door 32 is located to give access to the fire-pot and this door may have and is shown as having an opening 33 provided with a closure 34 so that access may be had to the fire-pot without the necessity of opening the door 32. This is advantageous in permitting the operator to manipulate the coals in the fire chamber to cover a placed tire without the necessity of opening the larger door 32, which latter gives access to the fire-pot for building the fire or removing ashes therefrom.

Having placed the tire within the fire-pot and adjusted the fingers 30 so as to properly hold the tire about midway between the side plates 5, the fire is urged by the blower until the tire is sufficiently heated where embedded in the fire. Then the tire is rotated a suitable distance to bring a part not yet highly heated into the fire, the already heated portion retaining its heat because of the flames and hot gases of combustion rising from the bed of fire. The combustion is facilitated and the treatment of the tire to the fire is rendered efficient by the opening 26 and damper 27, which latter may be adjusted as needed. The blower-manipulating means and the manipulating means for the rollers 17 may be conveniently located in adjacent relation so that an operator may have no trouble in controlling both.

After the tire has been thoroughly heated to the desired degree the door 7 is opened in a downward direction as indicated in Fig. 3 and forms a support for the tire when the latter is withdrawn from the heating structure or heater. By utilizing the door 7 as a support the handling of the hot tire is greatly facilitated and it is an easy matter for a single operator to remove the tire from the heater and place it upon the wheel onto which it is to be shrunken.

The rollers 17 are readily placed at different heights by the use of a greater or less number of blocks 14 or the removal of all the blocks when a tire of largest diameter for which the machine is adapted is to be heated. The blocks 14 are either placed in position or removed through the openings 13 which are large enough for the purpose and these openings being located at a low level do not interfere materially with the action of the heater, nor permit the escape of gases of combustion to any harmful extent.

Instead of providing a series of blocks 14 to adjust the height of the tire supporting rollers 17, the structure shown in Fig. 9 may be used. A block 14$^a$ with side wings 15$^a$ is mounted to slide in each slot 12 and an adjusting screw 16$^a$ provided with a manipulating crank 17$^a$ or the like is threaded through a guide 17$^b$ on each wall below a slot 12. With such structure the rollers 17 may be adjusted up and down as needed.

What is claimed is:—

1. A tire heater comprising a casing of a size to house the tire to be heated, said casing being provided with a heating chamber at its lower portion, supporting rollers for the tire located at opposite sides of the fire chamber out of the heating zone, and means for carrying the rollers at different heights above the heating chamber and the same horizontal distance apart in underriding relation to the tire for maintaining tires of different sizes with their lowermost portions at approximately like levels.

2. A tire heater comprising a casing with a fire chamber at its lower portion, rollers adapted to the interior of the casing for supporting the tires, and a series of removable bearing blocks for the rollers adapted to be stacked one on the other, with the casing slotted to receive the stacks, whereby the rollers may be journaled at different heights to support tires of different diameters with their lowermost points at substantially the same level.

3. A tire heater comprising a casing with a fire chamber at the lower portion, the sides of the casing having upright matching slots in the opposite sides, a series of journal blocks adapted to the slots for arrangement in upright stacks, supporting rollers for the tires adapted to any of matching pairs of bearing blocks lodged in the slots, and means for turning said rollers together in the same direction to revolve the tires.

4. A tire heater comprising a casing with a fire chamber at the lower portion, the sides of the casing having upright matching slots in the opposite sides, a series of journal blocks adapted to the slots for arrangement in upright stacks, and supporting rollers for the tires adapted to any of matching pairs of bearing blocks lodged in the slots, said casing having a pair of matching and independently adjustable guide fingers at its upper portion for engaging tires of different sizes and widths and holding them on the supporting rollers.

5. A tire heater comprising a casing with a fire chamber at the lower portion, the sides of the casing having upright matching slots in the opposite sides, journal blocks adapted to the slots for adjustment to different heights, and supporting rollers for the tires adapted to matching pairs of bearing blocks lodged in the slots, said casing having a pair of matching and independently adjustable guide fingers at its upper portion for engaging tires of different sizes and widths and holding them on the supporting rollers, and said supporting rollers being located on opposite sides of and above the fire chamber out of the path of gases of combustion rising from the fire chamber.

6. A tire heater comprising a casing with a fire chamber at its lower portion, and supporting means for a tire located within the casing, said casing having one side hinged to the body of the casing at a low point to constitute a door opening downwardly to thereby form a rounded support to hold a heated tire on removal from the casing.

7. A tire heater comprising a casing with a fire chamber at a low point, and supporting rollers for a tire located in the casing on opposite sides of the fire chamber in position to underride the tire, said casing having one side hinged to the body of the casing at a low point and opening downwardly to constitute a holder into which a heated tire may be rolled and held clear of the ground, one of said rollers aiding the transfer of the tire from casing to holder.

In testimony that I claim the foregoing as my own. I have hereto affixed my signature.

JOHN J. FAHRNEY.